(No Model.)

E. P. JANVIER.
GAGE WHEEL ATTACHMENT FOR DRILL TEETH.

No. 333,858. Patented Jan. 5, 1886.

Witnesses:
Isaac R. Starkey
Edward W. Hepburn

Inventor.
Edward P. Janvier

UNITED STATES PATENT OFFICE.

EDWIN P. JANVIER, OF STILL POND, MARYLAND.

GAGE-WHEEL ATTACHMENT FOR DRILL-TEETH.

SPECIFICATION forming part of Letters Patent No. 333,858, dated January 5, 1886.

Application filed May 22, 1885. Serial No. 166,405. (No model.)

*To all whom it may concern:*

Be it known that I, EDWIN P. JANVIER, a citizen of the United States, residing at Still Pond, in the county of Kent, State of Maryland, have invented a new and useful appliance for the purpose of attaching a wheel to the teeth or hoes of grain-drills to regulate the depth at which the said teeth shall deposit the seed and fertilizer in the ground, of which the following is a specification.

This invention relates to improvements in and devices for attaching a gage or covering wheel for graduating the depth of penetration of the teeth of grain-drills.

Figure 1:
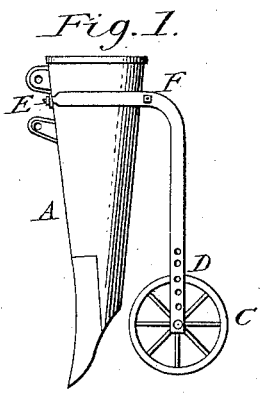
Figure 2:
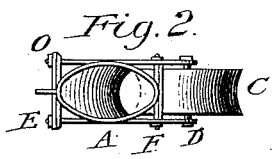
Figure 3:
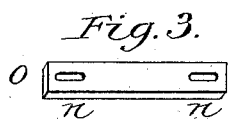
Figure 4:
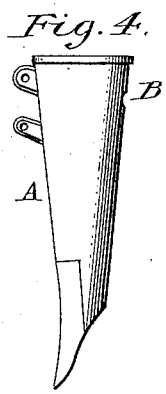

Figure 1 is a side view; Fig. 2, a top or plan view; Fig. 3, a view of the clamp; Fig. 4, a side view of tooth with gage-wheel removed.

A represents the tooth of an ordinary drill; B, one or more notches formed in the rear side of the tooth; C, gage or covering wheel; D, arms in which the wheel is journaled; E, front end of arm D, screw-threaded for the reception of the clamp and nuts, and pierced at the opposite end with holes for the journals of the gage-wheels; F, bolt with a nut on each end, and that takes into a notch in the rear of the tooth for holding the arms that support the gage-wheels. To the tooth A, by the front and rear bolts, the arms D of the gage-wheels are adjustably attached, the arms having a series of orifices for the reception of the journal of the gage-wheel C, whereby it may be raised or lowered, thereby graduating the penetration of the point of the tooth A, and consequently the depth to which the seed or fertilizer is deposited.

Having described my invention, what I claim is—

The drill-tooth A, having the notch or notches B for the reception of the clamping-bolt F, in combination with the perforated arms D, and adjustable gage or covering wheel C, with the slotted clamp O, substantially as shown and described.

EDWIN P. JANVIER.

Witnesses:
L. S. FOWLER,
S. H. BLACKISTON.